(12) United States Patent
Mukhopadhyay et al.

(10) Patent No.: US 10,838,712 B1
(45) Date of Patent: Nov. 17, 2020

(54) LIFECYCLE MANAGEMENT FOR SOFTWARE-DEFINED DATACENTERS

(71) Applicant: VMware, Inc., Palo Alto, CA (US)

(72) Inventors: Sudipto Mukhopadhyay, Palo Alto, CA (US); Swapneel Ambre, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/453,484

(22) Filed: Jun. 26, 2019

(51) Int. Cl.
*G06F 9/445* (2018.01)
*G06F 8/658* (2018.01)
*G06F 3/0482* (2013.01)
*G06F 8/61* (2018.01)
*G06F 8/71* (2018.01)

(52) U.S. Cl.
CPC ............ *G06F 8/658* (2018.02); *G06F 3/0482* (2013.01); *G06F 8/61* (2013.01); *G06F 8/71* (2013.01)

(58) Field of Classification Search
CPC .......... G06F 8/658; G06F 3/0482; G06F 8/61; G06F 8/71
USPC .................................................. 717/100–120
See application file for complete search history.

(56) References Cited

U.S. PATENT DOCUMENTS

| 10,572,108 B2 * | 2/2020 | Bonchev ............... G06F 3/0605 |
| 2016/0139915 A1 | 5/2016 | Dimitrakos |
| 2017/0060570 A1 | 3/2017 | Miller |

* cited by examiner

*Primary Examiner* — Chuck O Kendall
(74) *Attorney, Agent, or Firm* — Clayton, McKay & Bailey, PC

(57) ABSTRACT

Examples described herein include systems and methods for efficiently and effectively managing upgrades to an SDDC. More specifically, examples described herein relate to allowing various upgrade paths that can upgrade an SDDC directly to a desired version, without the need for intermediate upgrades. The upgrades can be selected by a user through a graphical user interface ("GUI") described herein. The examples further describe a version-compliance configuration matrix that identifies various acceptable combinations of software components and versions. The examples also describe a process for providing a customized upgrade package suited to a particular customer or user. Additional examples describe a mechanism for retracting and correcting bad patches or upgrades after they have been released.

20 Claims, 9 Drawing Sheets

LIFECYCLE MANAGEMENT FOR SOFTWARE-DEFINED DATACENTERS

BACKGROUND

In a software-defined data center ("SDDC"), infrastructure elements are virtualized and delivered as a service. Networking, storage, processing, and security functions can execute as virtualized components on top of physical hardware devices, such as servers. An SDDC can span one or more clouds. By virtualizing aspects of a regular data center, an SDDC can allow for easier and more flexible deployments that scale according to company or client needs.

SDDCs require continual updating of the various software components within the SDDC. This process is generally referred to as lifecycle management or lifecycle orchestration. Different components of the SDDC can include different types of software, therefore requiring different upgrade packages. But because various software components of an SDDC must sometimes work together, upgrading a component can break compatibility with another component. Typically, an SDDC administrator must carefully study and manage component dependencies in order to upgrade components in a manner that retains compatibility with other components. As the number of components and available versions grow, the task of managing upgrades can become overwhelming. These drawbacks can result in decreased efficiency, outdated software, and broken SDDC systems.

A need therefore exists for an efficient mechanism for managing component dependencies and applying upgrades to an SDDC in a manner that retains functionality of the SDDC without requiring much, if any, work from an SDDC administrator.

SUMMARY

Examples described herein include systems and methods for efficiently and effectively managing upgrades to an SDDC. More specifically, examples described herein relate to allowing various upgrade paths that can upgrade an SDDC directly to a desired version, without the need for intermediate upgrades. The upgrades can be selected by a user through a graphical user interface ("GUI") described herein. The examples further describe a version-compliance configuration matrix that identifies various acceptable combinations of software components and versions. The examples also describe a process for providing a customized upgrade package suited to a particular customer or user. Additional examples describe a mechanism for retracting and correcting bad patches or upgrades after they have been released.

An example method for lifecycle management in an SDDC is provided. The example method can include receiving an upgrade-path manifest that can guide an upgrade procedure for the SDDC. The upgrade-path manifest can be utilized by an SDDC manager at the SDDC. An SDDC manager can be one or more software applications running on one or more virtual machines on top of the virtual infrastructure that it is managing. In other words, the SDDC manager can be a component of the SDDC that it manages. The SDDC manager can run within a standalone SDDC manager instance with storage, compute, and networking components. The SDDC manager instance can also include components for supporting authentication, log aggregation and analysis, monitoring, automated performance management, cloud planning, and capacity optimization. The SDDC manager, as that term is used herein, can refer to the software applications, the SDDC manager instance running those applications, or the combination thereof.

The SDDC manager can create and delete additional SDDC workload instances. Each SDDC workload instance can be an SDDC instance with its own storage, compute, and network isolation (micro-segmentation and security). The SDDC manager can be responsible for lifecycle management of the various SDDC workload instances, such as by upgrading the various software components on those instances. Together, the SDDC manager and various SDDC workload instances can be considered an SDDC, as that term is used herein.

The upgrade-path manifest can indicate various configurations for the SDDC, with each configuration including one or more SDDC software elements along with a corresponding version. For example, a configuration can include a first SDDC element having a first version, as well as a second SDDC element having a second version. The terms "first version" and "second version" are used merely to distinguish different versions from one another and are not intended to identify or be limited to a particular version. Moreover, the first and second SDDC elements can be any software elements within the SDDC, such as software components within an SDDC workload instance or within the SDDC manager instance. The first and second SDDC elements can also be located at different locations, such as on different clouds within different SDDC workload instances, in another example.

The upgrade-path manifest can include a source configuration for the SDDC as well as first and second configurations for the SDDC, where the first and second configurations reflect possible upgraded configurations for the SDDC. The upgrade-path manifest can also include at least first and second upgrade paths, each identifying a sequence of upgrade bundles to install to upgrade the SDDC from the source configuration to a new configuration, such as the first or second configurations.

The SDDC manager can use the upgrade-path manifest to determine that the first and second configurations are available as upgrades to the SDDC. The determination can be made based on a current configuration for the SDDC matching the source configuration in the upgrade-path manifest. The example method can further include displaying, based on the determination that the first and second configurations are available, first and second graphical elements the correspond to the first and second configurations, respectively.

Based on a GUI selection of one of the graphical elements, such as the second graphical element, the example method can include implementing the second upgrade path by installing the second sequence of upgrade bundles. The second upgrade path can be optimized to skip installation of at least one intermediate upgrade bundle that is associated with the first upgrade path. The second upgrade path can thereby provide a "jump" or "skip" that avoids an intermediate state, simplifying the upgrade process.

To execute the second upgrade path, an agent on the SDDC, such as the SDDC manager, can execute the second upgrade path based on an ordered sequence of upgrade bundles identified in the upgrade-path manifest. The ordered sequence of upgrade bundles for the second upgrade path can omit one or more upgrade bundles associated with the first upgrade path.

The SDDC can receive the upgrade-path manifest from a software depot. In some examples, depending on the current state of a customer's SDDC, the SDDC may require a customized solution for an upgrade path. In these examples, a custom upgrade-path manifest can be generated and associated with an identifier associated with the customer. The custom upgrade-path manifest can be generated by a master orchestrator based on information received from the SDDC regarding the current configuration for the SDDC. When the SDDC attempts to retrieve an upgrade-path manifest from the software depot, the identifier can be used to select a custom upgrade-path manifest suited to the customer.

Applying the upgrade bundles according to an upgrade path can also include validating the versions of the relevant SDDC elements against a compliance matrix to check interoperability with other SDDC elements. This can include projecting future versions of SDDC elements based on the bundle sequence identified previously. The compliance matrix can include various validated configurations that identify groups of SDDC elements and their respective versions that are known to work together. If an upgrade bundle would result in a configuration that is not contained in the compliance matrix, the orchestrator or SDDC manager can block the upgrade bundle from being applied to the relevant SDDC element. Each bundle can include a metadata manifest with information necessary to validate the bundle against the compliance matrix.

An example method is also provided for handling an upgrade bundle that is faulty, problematic, or otherwise not suitable for installation or use. In that example, an SDDC can receive a blacklist identifying a blacklisted upgrade bundle. This can occur regardless of whether the SDDC has downloaded the upgrade bundle previously. For example, the SDDC can remove the blacklisted upgrade bundle from a storage location and delete related binary entries. Additionally, the SDDC can add an identifier of the blacklisted upgrade bundle to a blacklist of upgrade bundles, stored at the SDDC, indicating that the blacklisted bundle should not be downloaded or installed in the future.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for efficiently and effectively managing upgrades to an SDDC. More specifically, examples described herein relate to allowing various upgrade paths that can upgrade an SDDC directly to a desired version, without the need for intermediate upgrades. The upgrades can be selected by a user through a graphical user interface ("GUI") described herein. The examples further describe a version-compliance configuration matrix that identifies various acceptable combinations of software components and versions. The examples also describe a process for providing a customized upgrade package suited to a particular customer or user. Additional examples describe a mechanism for retracting and correcting bad patches or upgrades after they have been released.

Figure 1A:
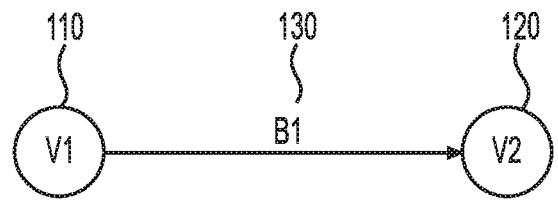
FIG. 1A is an illustration of an example bundle that can upgrade an SDDC element from a first version to a second version.

FIG. 1A is an illustration of an example upgrade bundle (B1) 130 for upgrading an SDDC software element from a first version (V1) 110 to a second version (V2) 120. The arrow between the two versions (V1, V2) 110, 120 indicates the direction of the upgrade. As described in more detail later, an orchestrator at the SDDC can receive the bundle (B1) 130. The orchestrator can then confirm that applying the bundle would not fall outside the bounds set forth in a compliance matrix (described with respect to FIG. 2). The orchestrator can then apply the upgrade bundle (B1) 130, upgrading the SDDC software element from V1 to V2.

In some examples, the upgrade bundle (B1) 130 can only be applied to a particular version of the SDDC software element. For example, upgrade bundle (B1) 130 can be configured to apply only to version V1 of the SDDC software element, upgrading the element from version V1 to V2. In that example, the same upgrade bundle (B1) could not be applied to a different version of the same element. This is illustrated in more detail by FIG. 1B.

Figure 1B:
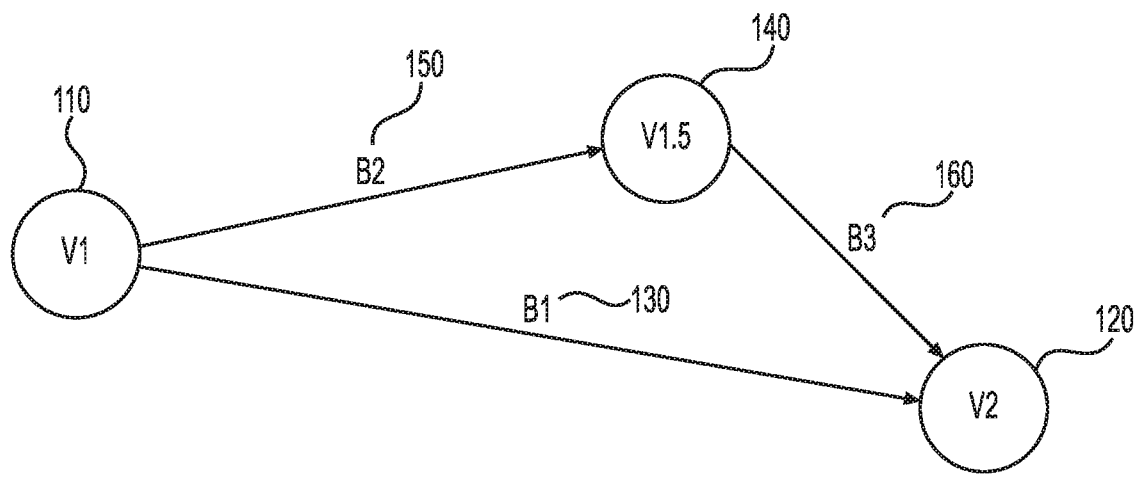
FIG. 1B is an illustration of various example bundles that can upgrade SDDC elements in various ways.

FIG. 1B is an illustration of several example upgrade bundles that can apply to different versions of an SDDC software element. FIG. 1B shows the same initial version (V1) 110 for the SDDC software element. Two upgrades paths are shown to take the element from version V1 110 to version V2 120. In one example, upgrade bundle B1 can be applied to version V1 of the SDDC software element, upgrading it directly to version V2, as also shown in FIG. 1A.

In another example upgrade path, the SDDC software element can be upgraded from V1 110 to V1.5 140 to V2 120. In that example, two upgrade bundles (B2, B3) 150, 160 can be applied to upgrade the element to version V2. Specifically, upgrade bundle B2 150 can be applied to upgrade version V1 to version V1.5, while upgrade bundle B3 160 can be applied to upgrade version V1.5 to version V2. As mentioned above, in some examples each bundle can only be applied to a particular beginning version of the SDDC element. In other words, after applying bundle B2 150 to upgrade the element from V1 to V1.5, bundle B1 130 can no longer be applied to the element. This is because, in this example, bundle B1 130 is only applicable to version V1 of the element. Therefore, a different bundle (B3) 160, specific to version V1.5, is required to upgrade the element from V1.5 to V2.

FIGS. 1A and 1B highlight the basics of applying bundles to upgrade a single SDDC element from one version to another. Each bundle can be configured to apply to a particular beginning version and upgrade it to a particular final version. In some examples, the bundles must be applied in a specific order to achieve the desired result. For example, in order to upgrade an SDDC element from V1 to V1.5 to V2, bundle B2 must be applied before bundle B3. The bundles could not be applied in the reverse order in that example.

While FIGS. 1A and 1B relate to a single SDDC element, a given SDDC can have multiple SDDC elements with various interdependencies with respect to one another. For example, the SDDC element described in FIGS. 1A and 1B can be referred to as "S1," which a second SDDC element (not shown) can be referred to as "S2." S1 can be upgraded from V1 to V2 directly, or it can be upgraded from V1 to V1.5 to V2. S2 can be upgraded from V4 to V5 to V6. In this example, S1:V1.5 is not compatible with S2:V4 but is compatible with S2:V5. Therefore, in order to upgrade both SDDC elements to the most recent versions, an SDDC manager can cause S2 to be upgraded from V4 to V5, then upgrade S1 from V1 to V1.5, then upgrade S2 from V5 to V6, and finally upgrade S1 from V1.5 to V2. This example is merely provided to highlight how the element interdependencies can affect the upgrade process.

Figure 2:
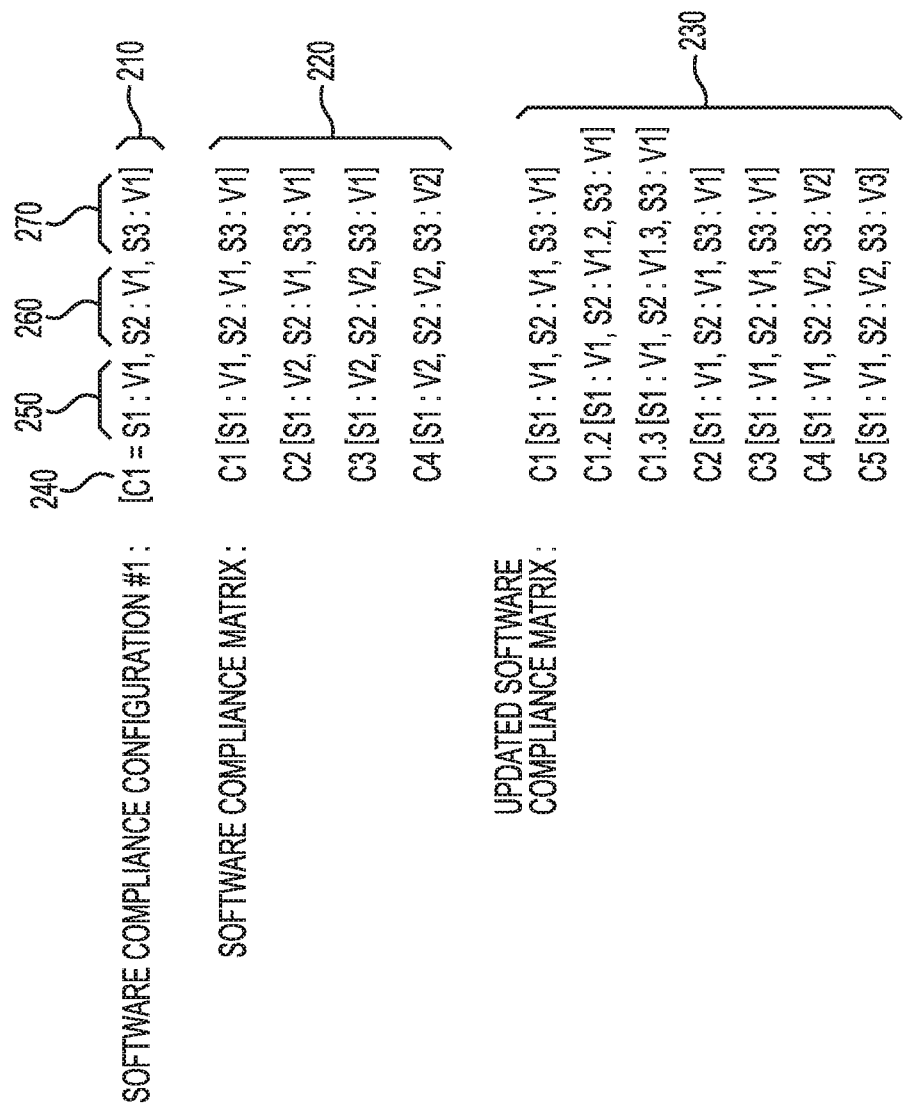
FIG. 2 is an illustration of an example compliance matrix.

With various SDDC elements existing on an SDDC, the interdependencies can quickly become too complex to view on an individual basis. One solution, as shown in FIG. 2, is to create a software compliance configuration 210 for a collection of SDDC elements (and their respective versions) that are compliant with one another. For example, configuration 210 in FIG. 2 shows a configuration identifier 240 (depicted as C1) as well as three pairings 250, 260, 270 of SDDC elements and version numbers. Pairing 250 depicts a first SDDC element (S1) paired with a first version of that element (V1). Pairing 260 depicts a second SDDC element (S2) paired with a first version of that element (V1). Pairing 270 depicts a third SDDC element (S3) paired with a first version of that element (V1).

Configuration 210 represents a combination of compatible SDDC-element/version pairings 250, 260, 270. In some examples, a system administrator can validate the particular combination of pairings 250, 260, 270 reflected by a configuration 210, such as by testing the configuration 210 in a virtualized test environment. Multiple configurations 210 can be stored together in a matrix, such as a compliance matrix 220.

Compliance matrix 220 includes four configurations, labelled C1-C4. Each configuration includes three pairings that relate to SDDC elements S1, S2, and S3. The configurations can be ordered in the matrix to provide context for upgrade decisions. For example, in the compliance matrix 220 of FIG. 2, SDDC element S3 is paired with V1 in configurations C1-C3, but paired with V2 in configuration C4. In one example, this means that if SDDC element S3 is to be upgraded to version V2, SDDC elements S1 and S2 must include versions that match the pairings in configuration C4 (in this case, both V2). On the other hand, configuration C2 indicates that SDDC element S1 can be upgraded to version V2 while elements S2 and S3 remain in version V1. These are merely a few example indications provided by the compliance matrix 220.

FIG. 2 also depicts a modified compliance matrix 230. In this example, some version indicators include sub-version information, such as V1.2 and V1.3. These versions may have been released after the compliance matrix 220 was published. Similarly, a configuration with new versions V3 has been added to the compliance matrix to form the modified compliance matrix 230. The same interdependency rules can apply to the configurations of the modified compliance matrix 230.

When a compliance matrix is generated or modified, it can be copied into a metadata manifest. The metadata manifest can be uploaded to a software depot accessible by an SDDC manager instance running on top of the SDDC. The SDDC manager can poll the software depot and, if a metadata manifest is present in the depot, compare a release number of the metadata manifest to the release number of the metadata manifest currently stored at the SDDC. If the metadata manifest in the depot has a newer release number than the stored manifest, the SDDC can download and replace the metadata manifest stored at the SDDC.

The compliance matrix of FIG. 2 includes generalized variables for different SDDC element types and corresponding versions. The SDDC element types can include any software component executing on an SDDC, such as license inventory and management tools, lifecycle management tools, virtualized networking and security tools, platform services controller tools, server management tools, bare metal hypervisor tools, cloud automation tools, and log management and analytics tools, for example.

Figure 3:
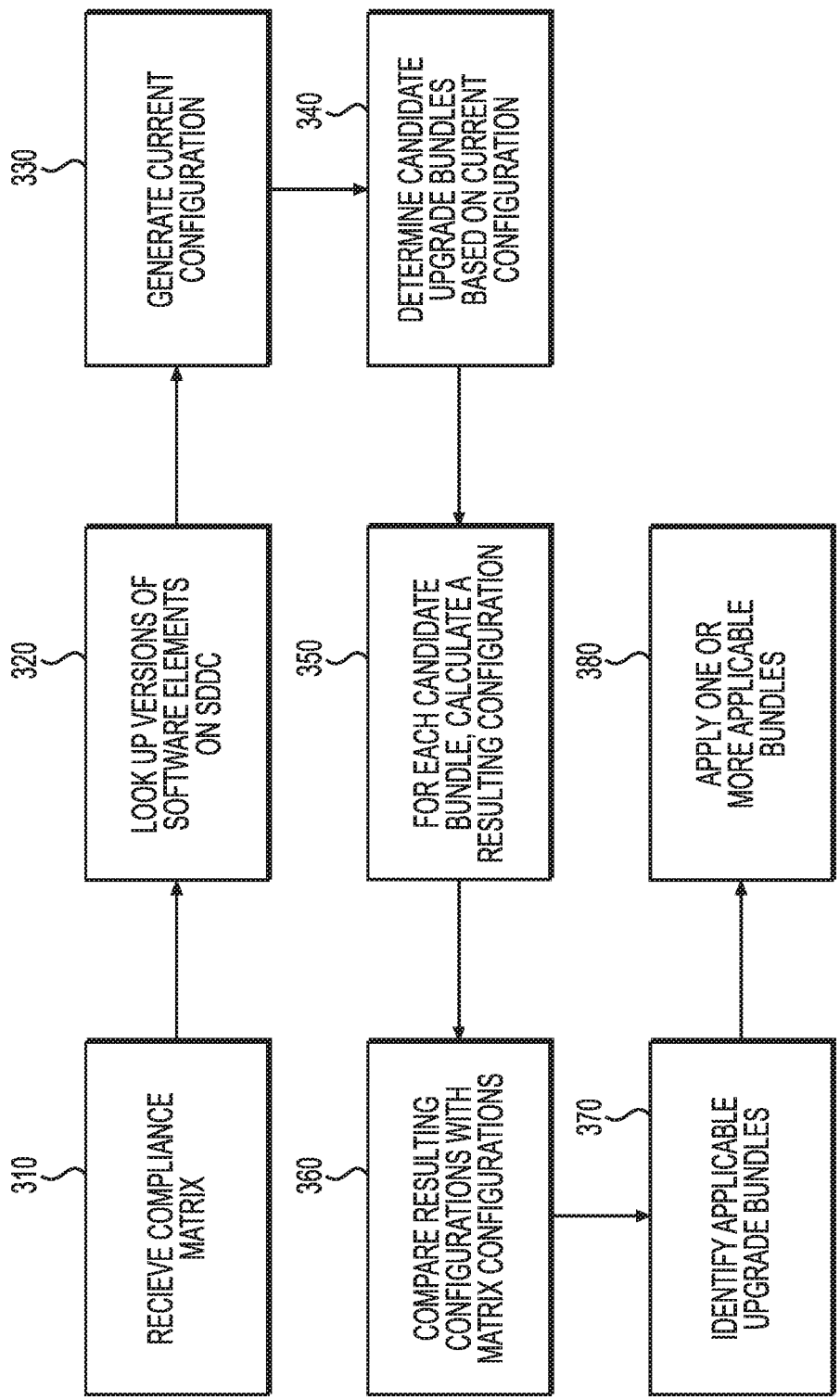
FIG. 3 is a flowchart of an example method for validating a bundle against a compliance matrix.

The compliance matrix of the metadata manifest can guide the process of applying software upgrade bundles by the SDDC manager instance. FIG. 3 provides an example flowchart of the process. At stage 310, the SDDC manager instance can receive the compliance matrix, such as by receiving a metadata manifest as described previously. In one example, different compliance matrices can be sent to different customers, based on which SDDC elements and associated versions are available for a particular customer.

At stage 320, the SDDC manager instance can perform a lookup to determine the SDDC software elements present within the SDDC along with their corresponding versions. This can include querying various orchestrators within the SDDC to request a listing of SDDC software elements and associated versions managed by the orchestrators. This can be performed by making application programming interface ("API") calls to SDDC stacks running the respective orchestrators. Each orchestrator can respond with an identification of any SDDC software elements it manages, along with version information for those elements.

At stage 330, the SDDC manager instance can generate a current configuration based on the information received from stage 320. The configuration can take the same form as the configuration 210 of FIG. 2, including a configuration identification 240 and various pairings 250, 260, 270 of SDDC software elements and corresponding versions. In some examples, the configuration generated at stage 330 will match a configuration entry in the compliance matrix received at stage 310 of the method.

At stage 340, the SDDC manager instance can determine candidate upgrade bundles based on the current configuration generated at stage 330. In one example, the SDDC manager instance has access to a list of upgrade bundles that can potentially apply to an SDDC. For example, the list of upgrade bundles can be the upgrade bundles that have been uploaded to a software depot and are available for download by the SDDC workload instances within the SDDC.

Stage 340 can also include identifying the upgrade bundles that can be applied to the software versions reflected in the current configuration. For example, the current configuration can include pairing S3:V1, indicating that the SDDC currently includes software element S3 with version V1. Identifying upgrade bundles that can be applied to this element would include identifying upgrade bundles that can be applied to element S3, version V1. This process of identifying candidate upgrade bundles can be repeated for each element and version pairing included in the current configuration.

Stage 350 can include, for each candidate upgrade bundle identified at stage 340, calculating a resulting configuration that would hypothetically result from applying the upgrade bundle. For example, an upgrade bundle can upgrade element S3 from version V1 to version V2. The resulting configuration would therefore include pairing S3:V2, to reflect the result of applying the candidate upgrade bundle. In some examples, each candidate upgrade bundle can be used to generate a different resulting configuration at stage 350.

At stage 360, the SDDC manager instance can compare the resulting configurations with the validated configurations contained in the configuration matrix received at stage 310. This stage can include extracting the configurations from the configuration matrix and comparing them to each of the resulting configurations from stage 350. If a resulting configuration does not match any of the configurations in the configuration matrix, that resulting configuration can be discarded or otherwise marked as invalid. If a resulting configuration matches a configuration in the configuration matrix, then that resulting configuration can be identified or marked as a valid configuration.

Stage 370 can include identifying applicable upgrade bundles based on the valid resulting configurations identified at stage 360. For example, the SDDC manager instance can parse a valid resulting configuration and identify the element-version pairings within the configuration. For each of those pairing, the SDDC manager instance can identify a particular upgrade bundle that can be applied to upgrade an element to the version in the resulting configuration pairing. If a resulting configuration includes five pairings, for example, the SDDC manager instance can identify up to five upgrade bundles that could be applied to achieve that configuration.

Stage 380 can include selecting a configuration to be applied, identifying the applicable upgrade bundles required to achieve that configuration, and applying the applicable upgrade bundles. Stages 340-380 can be repeated to apply multiple iterations of upgrades to multiple SDDC elements. In this way, upgrades can be validated at each step, ensuring that the resulting software configurations work properly without causing unwanted issues.

The process described with respect to FIG. 3 can be applied to single upgrade bundles or to groups having multiple bundles. As the number of upgrade bundles grows, the resulting complexity with respect to ensuring SDDC element compliance also grows. In some examples, a service provider can generate an upgrade-path manifest that describes an upgrade path to take an SDDC from one configuration to another. As explained with respect to FIG. 2, a configuration for the SDDC can include multiple SDDC software elements and respective versions for each of those elements.

In some examples, upgrading from one configuration to another requires an intermediate upgrade to an intermediate configuration. For example, an SDDC administrator may need to apply a sequence of upgrades to reach the intermediate configuration and then perform testing and validation before continuing the upgrade process to reach the desired configuration. In some examples, multiple intermediate configurations can be required. However, in some examples it is possible to upgrade an SDDC directly from a current configuration to a desired configuration, without applying intermediate upgrades relating to intermediate configurations. An upgrade-path manifest can lay out an upgrade path for upgrading an SDDC while skipping unwanted intermediate configurations.

In some examples, skipping an intermediate configuration means that the intermediate configuration is never installed at the SDDC. For example, one or more software components of the SDDC can be upgrade directly to versions that correspond with a desired configuration. In other examples, skipping an intermediate configuration means that the relevant software components are upgraded through the intermediate configuration. In other words, the software components are upgraded step by step, but the upgrades continue without pausing at the intermediate configuration, for example.

The upgrade-path manifest can be a file, such as a file that includes metadata relating to one or more upgrade paths. An upgrade path can refer to a sequence of upgrade bundles to install in order to upgrade an SDDC from one configuration to another. A service provider can generate the upgrade-path manifest based on compliance information available to the service provider, such as the information used to generate a compliance matrix as shown in FIG. 2. The upgrade paths identified in the upgrade-path manifest can allow an SDDC administrator to save time and effort by upgrading the SDDC directly to the desired configuration.

Figure 4:
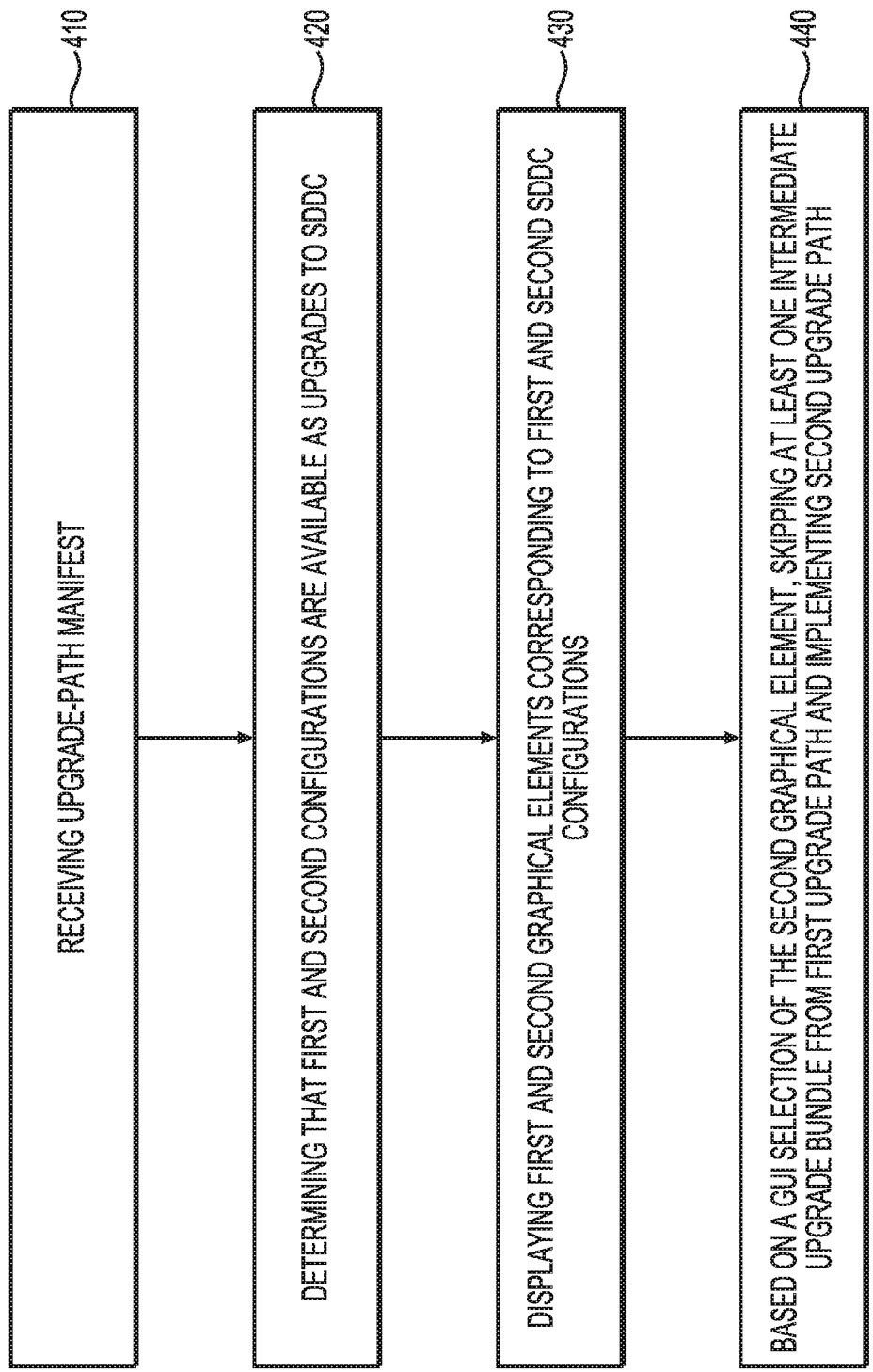
FIG. 4 is a flowchart of an example method for upgrading an SDDC.

FIG. 4 provides a flowchart of an example method for utilizing an upgrade-path manifest. Stage 410 of the method can include receiving an upgrade-path manifest at an SDDC. As explained in more detail later in this disclosure, receiving an upgrade-path manifest can include polling a software depot, identifying a relevant manifest, and downloading the manifest to the SDDC. The upgrade-path manifest can be stored in a persistent storage location at the SDDC.

The upgrade-path manifest can identify one or more upgrade paths for an SDDC. In one example, the upgrade-path manifest identified one or more upgrade paths based on one source configuration for the SDDC. For example, if the SDDC is currently at C1.3 (shown in FIG. 2), the upgrade-path manifest can identify one or more upgrade paths for upgrading an SDDC from C1.3 to other configurations, such as C3 and C4. The source configuration of the upgrade-path manifest can therefore describe a required beginning state for the SDDC. The upgrade-path manifest can also include first and second configurations that differ from the source configuration, as illustrated by example first and second configurations C3 and C4 from FIG. 2. In some examples, the upgrade-path manifest can include multiple source configurations, and for each source configuration, one or more upgrade paths for upgrading that source configuration to other configurations.

Stage 420 of the method can include determining that the first and second configurations are available as upgrades for the SDDC. The determination can include identifying a current configuration for the SDDC and matching that current configuration with a source configuration in the upgrade-path manifest. For example, the upgrade-path manifest can include configurations C1 and C1.3 as available source configurations, with corresponding upgrade paths applicable to each source configuration. If the SDDC's current configuration is C1.3, then stage 420 can include determining that the upgrade paths applicable to configuration C1.3 are available as upgrades. In this example, the available upgrade paths for configuration C1.3 are referred to as first and second upgrade paths. The first upgrade path can upgrade the configuration from C1.3 to C3, while the second upgrade path can upgrade the configuration from C1.3 to C4, for example.

Stage 430 can include displaying first and second graphical elements corresponding to the first and second SDDC configurations. As explained in more detail with respect to FIG. 8, the graphical elements can be displayed on a user interface accessible by an administrator for the SDDC, providing simple options for direct upgrades. In this example, the administrator provides a GUI selection of the second graphical element corresponding to the second SDDC configuration at stage 440. In response to receiving the selection, the SDDC can carry out the upgrades described in the relevant upgrade path of the upgrade-path manifest. Carrying out these upgrades can include skipping at least one intermediate upgrade bundle.

For example, if the user selects configuration C4 as the destination state, then at least one upgrade bundle relevant to configuration C3 can be skipped. In some examples, multiple upgrade bundles can be skipped. In this manner, the user does not need to pause the upgrade process at configuration C3 and perform validation testing before continuing the upgrades to configuration C4. Instead, the SDDC can simply be upgraded from the source configuration to the desired configuration without unnecessary intermediate steps.

Figure 5:
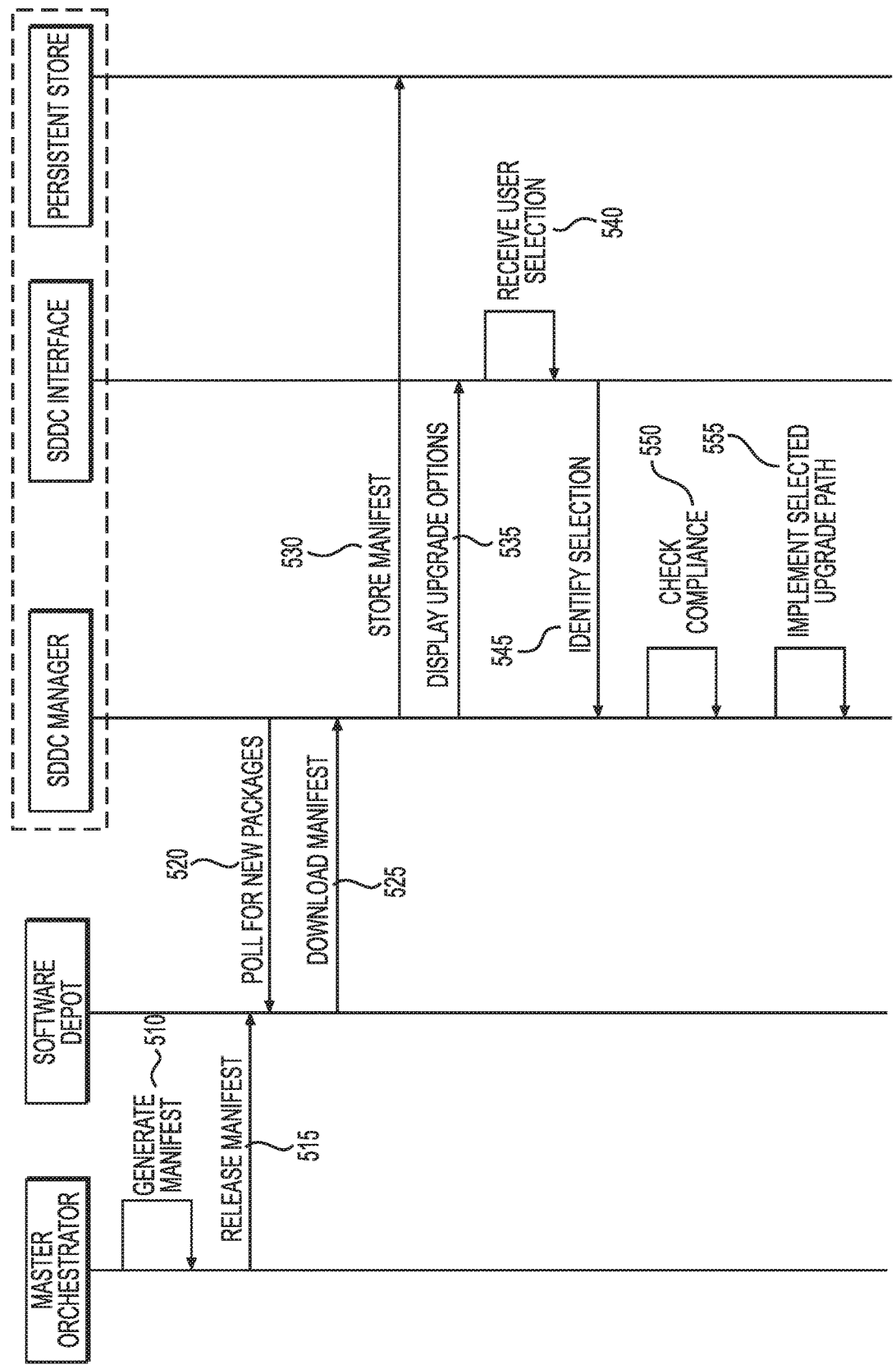
FIG. 5 is a sequence diagram of an example method for upgrading an SDDC.

FIG. 5 describes the process of FIG. 4 in greater detail. At stage 510, a master orchestrator can generate an upgrade-path manifest. The upgrade-path manifest can be generated based on at least one source configuration for an SDDC and can include at least one destination configuration for the SDDC based on the source configuration. In some examples, such as the examples described with respect to FIGS. 4 and 5, the upgrade-path manifest includes two or more destination configurations based on the same source configuration. The upgrade-path manifest can also include multiple destination configurations that each apply to one of several different source configurations, in an example.

The master orchestrator can be an entity, or group within an entity, that provides the overall SDDC infrastructure for the SDDC described herein. In other examples, the master orchestrator can be a computing machine implementing machine-learning techniques and various rules to create the upgrade-path manifest. The master orchestrator can have access to compatibility information, such as the information used to generate the compliance matrix of FIG. 2. This information can be used to generate the upgrade-path manifest.

After creating the upgrade-path manifest, the master orchestrator can release the upgrade-path manifest to a software depot at stage 515. This stage can include, for example, transmitting the manifest to a software depot accessible to multiple SDDCs. The software depot can also be used to store the individual upgrade bundles referenced within the manifest. An SDDC can be configured to poll for new information within the software depot. For example, at stage 520, the SDDC manager can poll the software depot. The SDDC manager can then determine if the upgrade-path manifest stored in the software depot has not yet been received. To make this determination, the SDDC manager can determine whether an upgrade-path manifest exists within a persistent storage location of the SDDC, and if so, whether that upgrade-path manifest includes an ID that matches the ID of the upgrade-path manifest in the software depot. If the upgrade-path manifest in the software depot has a new ID number, for example, the SDDC manager can download the upgrade-path manifest at stage 525. In some examples, this stage can also include downloading the individual upgrade bundles referenced by the upgrade-path manifest.

At stage 530, the SDDC manager can copy the upgrade path information from the manifest and save the information in a persistent storage location. Copying the upgrade path information at stage 530 can include copying the portions of the upgrade-path manifest as well as upgrade bundles identified by the upgrade-path manifest. For example, the upgrade bundles identified by the manifest can also be available for download from the software depot. Stage 530 can also include storing bundle mapping information, such as the metadata regarding the bundles within each upgrade path, including ID numbers, descriptions, versions, software types, and sequence numbers. This stage can also include storing information relevant to creating graphical elements reflecting the upgrade paths.

At stage 535, the SDDC manager can cause upgrade options to be displayed on an SDDC user interface. The interface can be presented within a web browser in one example. In another example, the interface is presented within a dedicated software-management platform or application. The graphical elements and interface interactions are described in more detail with respect to FIG. 8. In some examples, the upgrade options displayed at stage 535 are only those upgrade options available for the SDDC based on the SDDC's current configuration. In other words, if the upgrade-path manifest includes upgrade paths for five ending configurations, but only three of those paths are available when starting at the particular SDDC's current configuration, then only those three paths would be displayed at stage 535 in one example. In another example, the additional paths are displayed at this stage but grayed-out or otherwise depicted as unavailable.

At stage 540 of the method, the SDDC interface can receive a user selection. The user selection can include a selection of a particular upgraded configuration that was displayed at stage 535. The selection can then be identified to the SDDC manager at stage 545. In some examples, the selection can be made automatically based on rules implemented at the SDDC. For example, the SDDC manager can implement a rule indicating that when two upgrade paths are available, the SDDC should automatically be upgraded to the most-recent upgrade configuration.

Stage 550 can include checking compliance of the various upgrade bundles associated with a chosen upgrade path. For example, an upgrade path can identify several different upgrade bundles to be installed at the SDDC, including an order in which to install them. The SDDC manager can confirm that each installation of each individual upgrade bundle would result in a configuration that is present within an applicable compliance matrix, such as the compliance matrix of FIG. 2. If one or more upgrade bundles would result in a configuration that is not reflected in the compliance matrix, the SDDC manager can reject the upgrade at this stage. Rejecting the upgrade can also include sending a communication to the master orchestrator indicating the non-compliant upgrade bundle. The communication can also provide information regarding the current configuration of the SDDC, such that the master orchestrator can apply a fix relevant to that SDDC. This process is described in more detail with respect to FIG. 6.

If no compliance issues surface at stage 550, then at stage 555 the SDDC manager can implement the selected upgrade path. Implementing the selected upgrade path can include installing one or more upgrade bundles identified in the upgrade-path manifest for the selected upgrade path. In some examples, the compliance check at stage 550 is repeated after installation of each upgrade bundle.

In some examples, the upgrade-path manifest generated by the master orchestrator can apply across a wide variety of SDDCs. The upgrade-path manifest can therefore be universal across all, or at least some, of the available SDDCs having corresponding configurations. However, in some examples, an SDDC may not be suitable for application of a universal upgrade-path manifest. This can occur because of a failed compliance check at stage 650, for example, but can also occur for other reasons. Customers can run a wide variety of workloads and applications on the virtual infrastructure, some of which can span multiple SDDC workload instances and multiple physical sites. Additionally, some types of applications may cause issues with the normal upgrade path generated by the master orchestrator.

Figure 6:
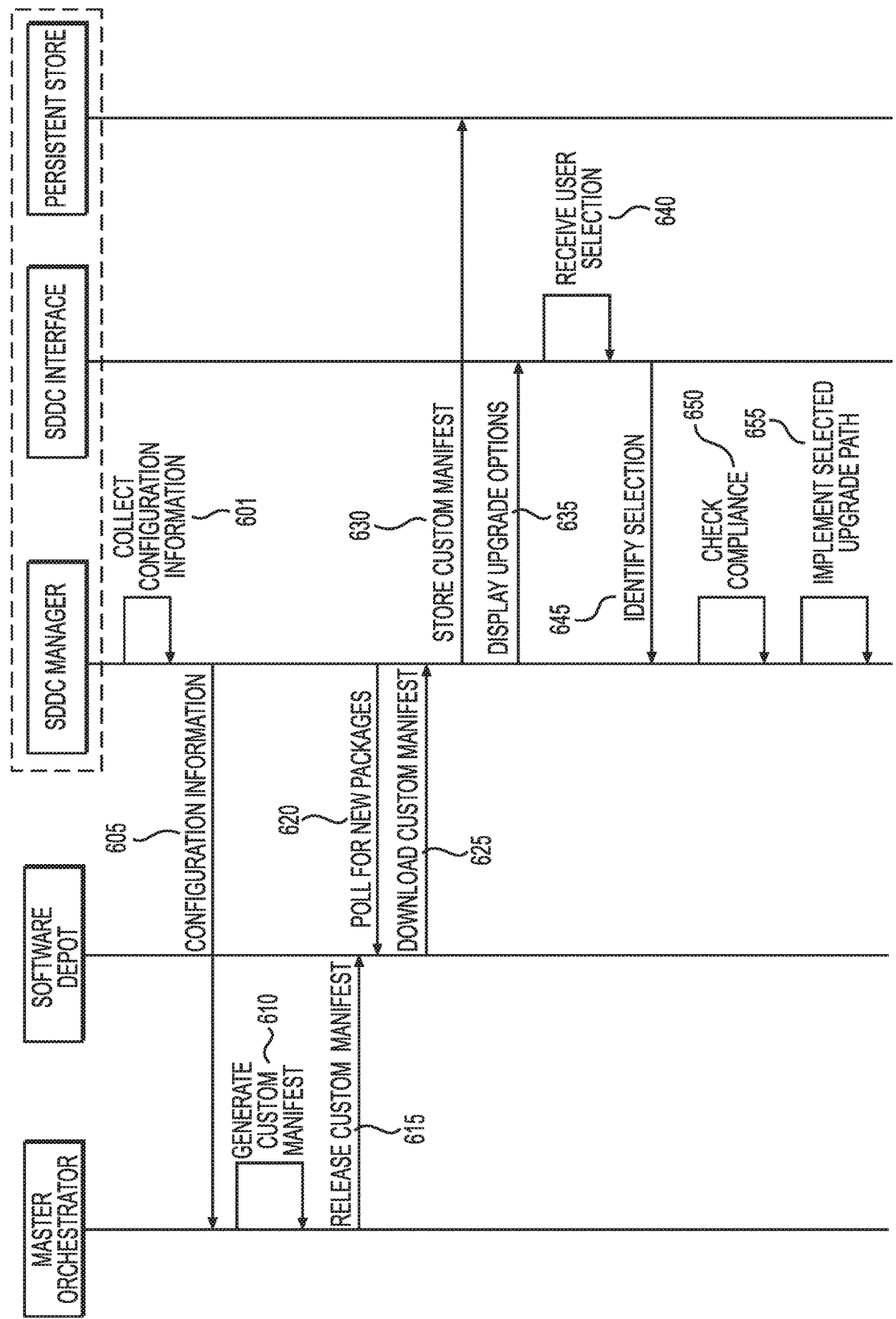
FIG. 6 is a sequence diagram of an example method for upgrading an SDDC using a custom manifest.

To solve the various issues that might arise when upgrade an SDDC, a method is provided for implementing a custom upgrade-path manifest, as shown in FIG. 6. The custom upgrade-path manifest can be customized for a particular SDDC or customized to solve a particular issue with implementing the standard upgrade-path manifest. The example method can include, at stage 601, collecting configuration information at the SDDC manager. This can be performed in response to a failed compliance check described at stage 550 of FIG. 5, for example. In another example, this stage can be performed based on a determination that an upgrade-path manifest does not include any viable upgrade paths for an SDDC. For example, the upgrade-path manifest may not provide an upgrade path for a source configuration that matches a current configuration of an SDDC.

The SDDC manager can collect configuration information at stage 601 and provide the information to the master orchestrator at stage 605. The configuration information can include various types of information about the SDDC, such as: the various SDDC software elements installed on the SDDC and their respective versions, the numbers and types of SDDC workload instances executing on the SDDC, version-compliance information regarding non-compliant upgrade bundles, a desired configuration for the SDDC to be upgraded to, and identification information identifying the SDDC.

At stage 610, the master orchestrator can generate a custom manifest based on the configuration information identified at stage 605. The particular manner in which the customer manifest is generated can vary based on the reason for requesting the custom manifest. For example, if a particular upgrade bundle is causing an upgrade failure, that upgrade bundle can be modified. The upgrade-path manifest can reflect a modified path that utilizes the modified upgrade bundle instead of the problematic upgrade bundle. In another example, a new upgrade bundle can be created to apply to a specific hardware or software layout at the SDDC. In yet another example, a new upgrade path is added to the upgrade-path manifest, allowing an SDDC to be upgrade to a configuration that was not otherwise provided in the standard upgrade-path manifest.

After creating the custom upgrade-path manifest, the master orchestrator can release the custom upgrade-path manifest to a software depot at stage 615, in the same manner as explained with respect to stage 515 of FIG. 5. This stage can include, for example, transmitting the custom manifest to a software depot accessible to multiple SDDCs. The software depot can also be used to store the individual upgrade bundles referenced within the custom manifest. An SDDC can be configured to poll for new information within the software depot. For example, at stage 620, the SDDC manager can poll the software depot. The SDDC manager can then determine if the custom upgrade-path manifest stored in the software depot has not yet been received. To make this determination, the SDDC manager can determine whether an upgrade-path manifest exists within a persistent storage location of the SDDC, and if so, whether that upgrade-path manifest includes an ID that matches the ID of the upgrade-path manifest in the software depot. If the upgrade-path manifest in the software depot has a new ID number, this can indicate that the upgrade-path manifest is new.

Additionally, stage 620 can include checking for a customer ID that identifies the customer or the SDDC. This customer ID can be provided to the master orchestrator at stage 605 for incorporation into the custom upgrade-path manifest. Stage 620 can therefore include confirming that a new upgrade-path manifest includes a matching customer ID, indicating that the upgrade-path manifest is intended for the correct SDDC. The SDDC manager can then download the upgrade-path manifest at stage 525. In some examples, this stage can also include downloading the individual upgrade bundles referenced by the custom upgrade-path manifest.

The remaining stages of FIG. 6 can track the similar stages of FIG. 5. At stage 630, the SDDC manager can copy the upgrade path information from the custom manifest and save the information in a persistent storage location. Copying the upgrade path information at stage 630 can include copying the portions of the custom manifest as well as upgrade bundles identified by the custom manifest. For example, the upgrade bundles identified by the custom manifest can also be available for download from the software depot. Stage 630 can also include storing bundle mapping information, such as the metadata regarding the bundles within each upgrade path, including ID numbers, descriptions, versions, software types, and sequence numbers. This stage can also include storing information relevant to creating graphical elements reflecting the upgrade paths.

At stage 635, the SDDC manager can cause upgrade options to be displayed on an SDDC user interface. The interface can be presented within a web browser in one example. In another example, the interface is presented within a dedicated software-management platform or application. The graphical elements and interface interactions are described in more detail with respect to FIG. 8. In some examples, the upgrade options displayed at stage 635 are only those upgrade options available for the SDDC based on the SDDC's current configuration. In some examples, only one upgrade option is shown in accordance with a single custom upgrade-path manifest. This may occur when a customer requested a custom upgrade path in order to reach a single desired configuration. In some examples where a custom upgrade-path manifest is utilized to reach a single desired configuration, stages 635, 640, and 645 can be skipped and the upgrade path can be automatically processed and applied.

At stage 640 of the method, the SDDC interface can receive a user selection. The user selection can include a selection of a particular upgraded configuration that was displayed at stage 635. The selection can then be identified to the SDDC manager at stage 645. In some examples, the selection can be made automatically based on rules implemented at the SDDC. For example, the SDDC manager can implement a rule indicating that when two upgrade paths are available, the SDDC should automatically be upgraded to the most-recent upgrade configuration. In another example, the SDDC manager can implement a rule indicating that when a custom upgrade path is available, the SDDC should automatically be upgraded using that custom path.

Stage 650 can include checking compliance of the various upgrade bundles associated with a chosen upgrade path. For example, an upgrade path can identify several different upgrade bundles to be installed at the SDDC, including an order in which to install them. The SDDC manager can confirm that each installation of each individual upgrade bundle would result in a configuration that is present within an applicable compliance matrix, such as the compliance matrix of FIG. 2. If one or more upgrade bundles would result in a configuration that is not reflected in the compliance matrix, the SDDC manager can reject the upgrade at this stage. Rejecting the upgrade can also include sending a communication to the master orchestrator indicating the non-compliant upgrade bundle. The communication can also provide information regarding the current configuration of the SDDC, such that the master orchestrator can apply a fix relevant to that SDDC. The fix could include, for example, generating a new custom upgrade-path manifest.

If no compliance issues surface at stage 650, then at stage 655 the SDDC manager can implement the selected upgrade path. Implementing the selected upgrade path can include installing one or more upgrade bundles identified in the upgrade-path manifest for the selected upgrade path. In some examples, the compliance check at stage 650 is repeated after installation of each upgrade bundle.

Figure 7:
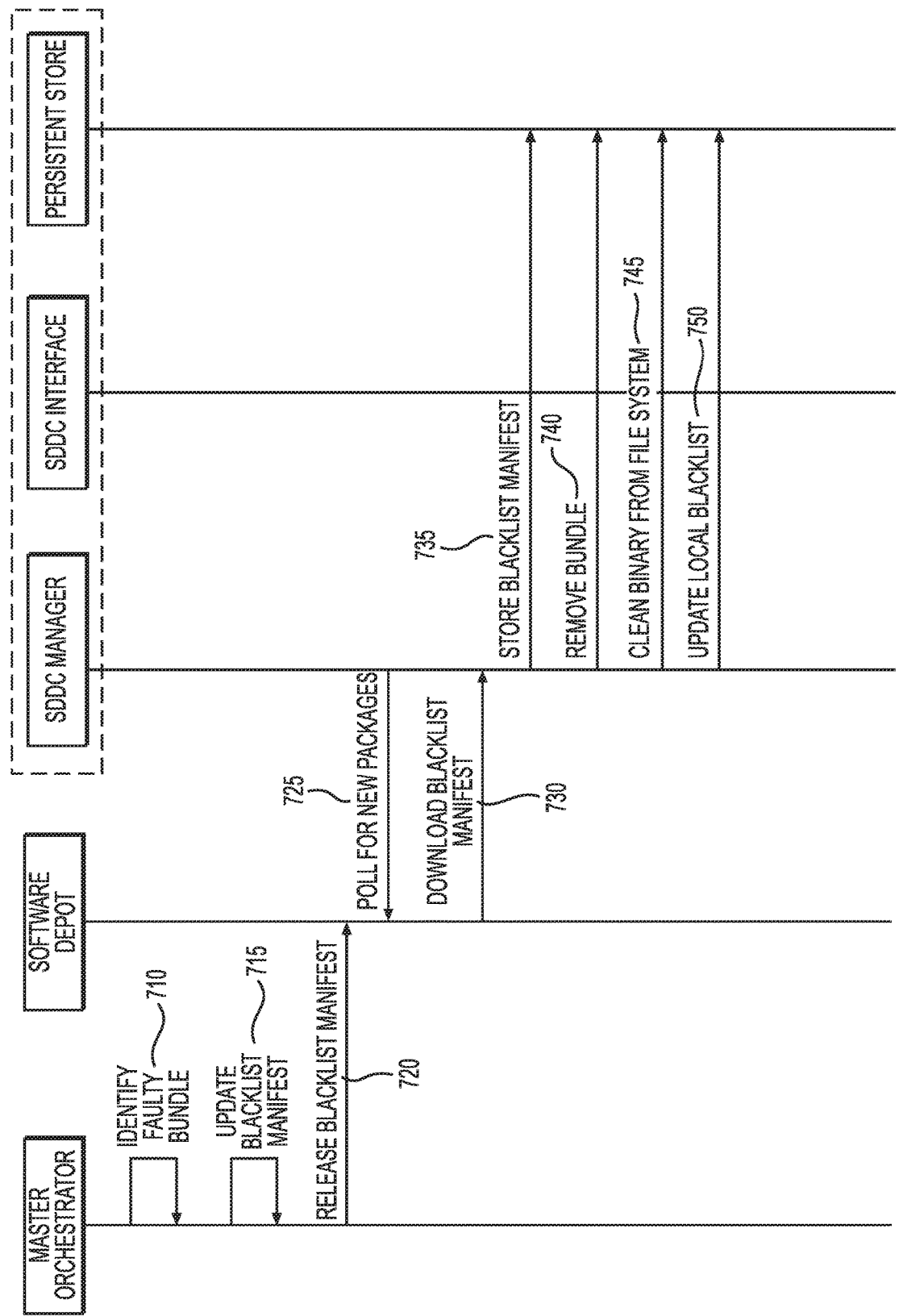
FIG. 7 is a sequence diagram of an example method for recalling a faulty upgrade bundle.

In some examples, bugs or mistakes are found in an upgrade bundle after the upgrade bundle has been transmitted to an SDDC. An example method is provided for handling upgrade bundles that are determined to be faulty for any reason. FIG. 7 provides a sequence diagram of such an example method.

Stage 710 of the example method can include identifying a faulty upgrade bundle at the master orchestrator. The term "faulty" is intended to capture a wide variety of issues, including any issue that provides a reason to recall, fix, or prevent from installation an upgrade bundle. These issues can include, for example, bugs in the code of an upgrade bundle, unforeseen compatibility issues caused by an upgrade bundle, installation failures associated with an upgrade bundle, and outdated information in an upgrade bundle. In some examples, the faulty bundle is identified by the master orchestrator, such as through validation testing performed by the master orchestrator. In other examples, the faulty bundle is identified based on feedback from an SDDC. For example, an SDDC manager can determine that an upgrade bundle is not compliant with a current configuration for the SDDC, such as at stage 550 of FIG. 5, and can report the compliance issue to the master orchestrator at that time. Faulty upgrade bundles can be reported to the master orchestrator in other ways as well, such as based on validation testing at the SDDC.

At stage 715, the master orchestrator can update a blacklist manifest to include an identification of the faulty upgrade bundle. The blacklist manifest can be a file, such as a file that includes metadata relating to one or more blacklisted upgrade bundles. The blacklist manifest can maintain a running list of blacklisted upgrade bundles. For each blacklisted upgrade bundle, the blacklist manifest can include an identification field. The blacklist manifest can also include a reason for inclusion on the blacklist, such as an identification of a bug. Additionally, the blacklist manifest can include its own version number, sequence number, and creation time value. These entries can be used by an SDDC to ensure the most recent blacklist manifest is used.

An example structure of a blacklist manifest is provided below:

```
{
  "version": "1.0",
  "sequence": 1,
  "creationTime": "1544807879",
  "blackListedBundles": [
    "id": "0aa93066-7a35-41bb-b136-d98 1e8cd32b1",
      "reason": "bug id 1234" },
    "id":     "b3c39623-5c7e-4d2a-aaa9-74b110668f0a",
      "reason": "bug id 2345" },
    "id":     "813816f7-c244-4f7b-a7dd-64cf68036982",
      "reason": "bug id 3456"
  ]
}
```

In the example blacklist manifest shown above, "version," "sequence," and "creationTime" fields are provided such that an SDDC can determine whether it has already downloaded the blacklist manifest. Additionally, three blacklisted upgrade bundles are listed under the "blackListedBundles" heading. For each blacklisted bundle, an alpha-numeric identification is provided. Additionally, for each bundle, a bug identification is provided as the "reason" for each bundle being present on the blacklist. Stage 715 can include creating the blacklist manifest or updating entries within the blacklist manifest. For example, it can include adding a new bundle to the blacklist.

After creating the blacklist manifest, the master orchestrator can release the blacklist manifest to a software depot at stage 720. This stage can include, for example, transmitting the manifest to a software depot accessible to multiple SDDCs. An SDDC can be configured to poll for new information within the software depot. For example, at stage 725, the SDDC manager can poll the software depot. The SDDC manager can then determine if the blacklist manifest stored in the software depot has not yet been received. To make this determination, the SDDC manager can determine whether a blacklist manifest exists within a persistent storage location of the SDDC, and if so, whether that blacklist manifest includes a version number or creation-time entry that matches the version number or creation-time entry of the blacklist manifest in the software depot. If the blacklist manifest in the software depot has a new version number, for example, the SDDC manager can download the blacklist manifest at stage 730.

At stage 735, the SDDC manager can copy information from the blacklist manifest and save it in a persistent storage location. Copying information from the blacklist manifest can include copying one or more bundle entries within the blacklist manifest, or it can include copying the entire blacklist manifest. At stage 740, the SDDC manager can remove any blacklisted upgrade bundles from the persistent storage location. This stage can include parsing the blacklist manifest to obtain IDs for each blacklisted manifest. It can also include searching the persistent storage location for any upgrade bundles that have an ID matching one of the IDs of the blacklisted bundles. If any upgrade bundles in the persistent storage location have a matching ID, the SDDC manager can cause that upgrade bundle to be permanently deleted from the storage location.

At stage 745, the SDDC manager can clean from the file system of the SDDC any binaries related to an upgrade bundle that has been blacklisted. This stage can include deleting the upgrade bundles themselves, as well as portions of code relating to an upgrade bundle. For example, the SDDC manager can delete portions of code indicating that a blacklisted upgrade bundle should be installed. In another example, the SDDC manager can delete the binary provided with, or generated by, the blacklisted upgrade bundle. Although FIG. 7 depicts this stage as occurring with respect to the persistent storage location, this stage can include cleaning binary from any portion of the file system of the SDDC.

At stage 750, the SDDC manager can update a local blacklist stored at the persistent storage location. The local blacklist can be a blacklist that matches the entries of the blacklist manifest. It can be used as a check to prevent download of a faulty upgrade bundle. For example, if the SDDC manager attempts to download a faulty upgrade bundle in the future, a compliance check against the local blacklist can result in an error, causing the SDDC manager to avoid downloading the faulty upgrade bundle. In this manner, the master orchestrator can perform recalls of faulty upgrade bundles by merely publishing a blacklist manifest to a central software depot.

Figure 8:
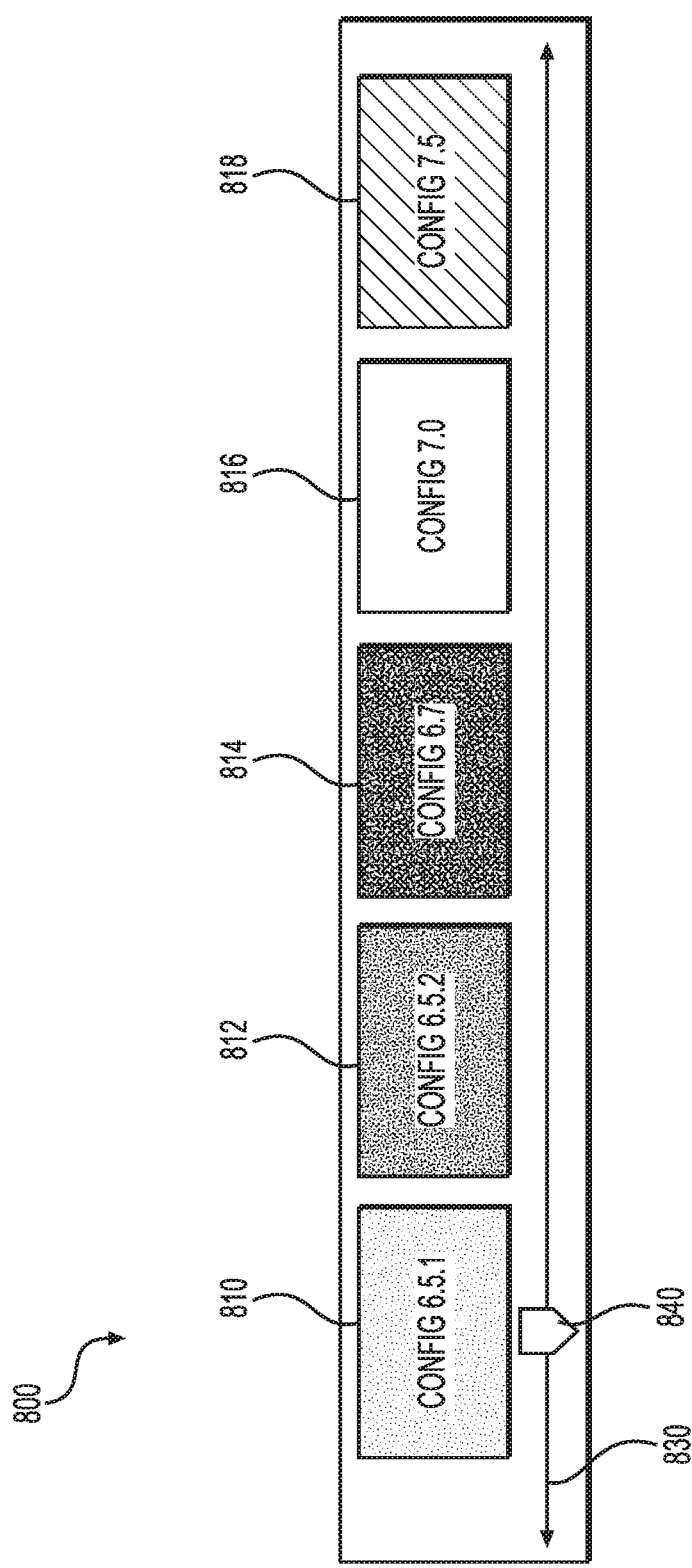
FIG. 8 is an illustration of an example GUI for selecting an upgrade level for an SDDC.

FIG. 8 is an illustration of an example GUI 800 that can be used to select an upgrade level for an SDDC, or a portion of an SDDC. This GUI 800 can be displayed within a browser application, for example, or within a software program for SDDC management. The GUI 800 can be displayed in response to an indication from the user that an upgrade is desired for the SDDC. In this example, several graphical elements 810, 812, 814, 816, and 818 are displayed. Each graphical element 810-818 corresponds to a particular configuration for an SDDC, or a portion of an SDDC.

In this particular example, each graphical element 810-818 corresponds to a version of one or more software components installed on the SDDC. For example, element 810 corresponds to configuration version 6.5.1, element 812 corresponds to configuration version 6.5.2, element 814 corresponds to configuration version 6.7, element 816 corresponds to configuration version 7.0, and element 818 corresponds to configuration version 7.5. In some examples, each element 810-818 can correspond to an SDDC configuration that reflects multiple software elements having specific versions.

In some examples, the present configuration or installation can be displayed as one of the elements 810-818. In the example of FIG. 8, element 810 can reflect the current installation version of an SDDC management software component, for example. A slider element 840 and accompanying slide path element 830 can be provided for selecting between the various elements 810-818. For example, a user can click and drag the slider element 840 along the slide path 830 to select the desired configuration state. This is merely one example mechanism for selecting a configuration state—in other examples, the selection can be made by clicking or tapping on the desired configuration state. In yet another example, a dropdown menu is provided for selecting the desired configuration state. Any selection mechanism may be used, allowing a user to view the various upgrade options that are available for a direct upgrade.

The GUI 800 of FIG. 8 can be utilized in conjunction with example methods described herein, such as at stages 430 and 440 of FIG. 4, stages 535 and 540 of FIG. 5, and stages 635 and 640 of FIG. 6. In some examples, the graphical elements 810-818 are displayed in sequential order, such that each successive graphical element 810-818 is one upgrade "level" away from the previous element. However, by allowing a user to select any graphical element 810-818, the user can skip intermediate upgrades and directly upgrade an SDDC to the desired level.

Figure 9:
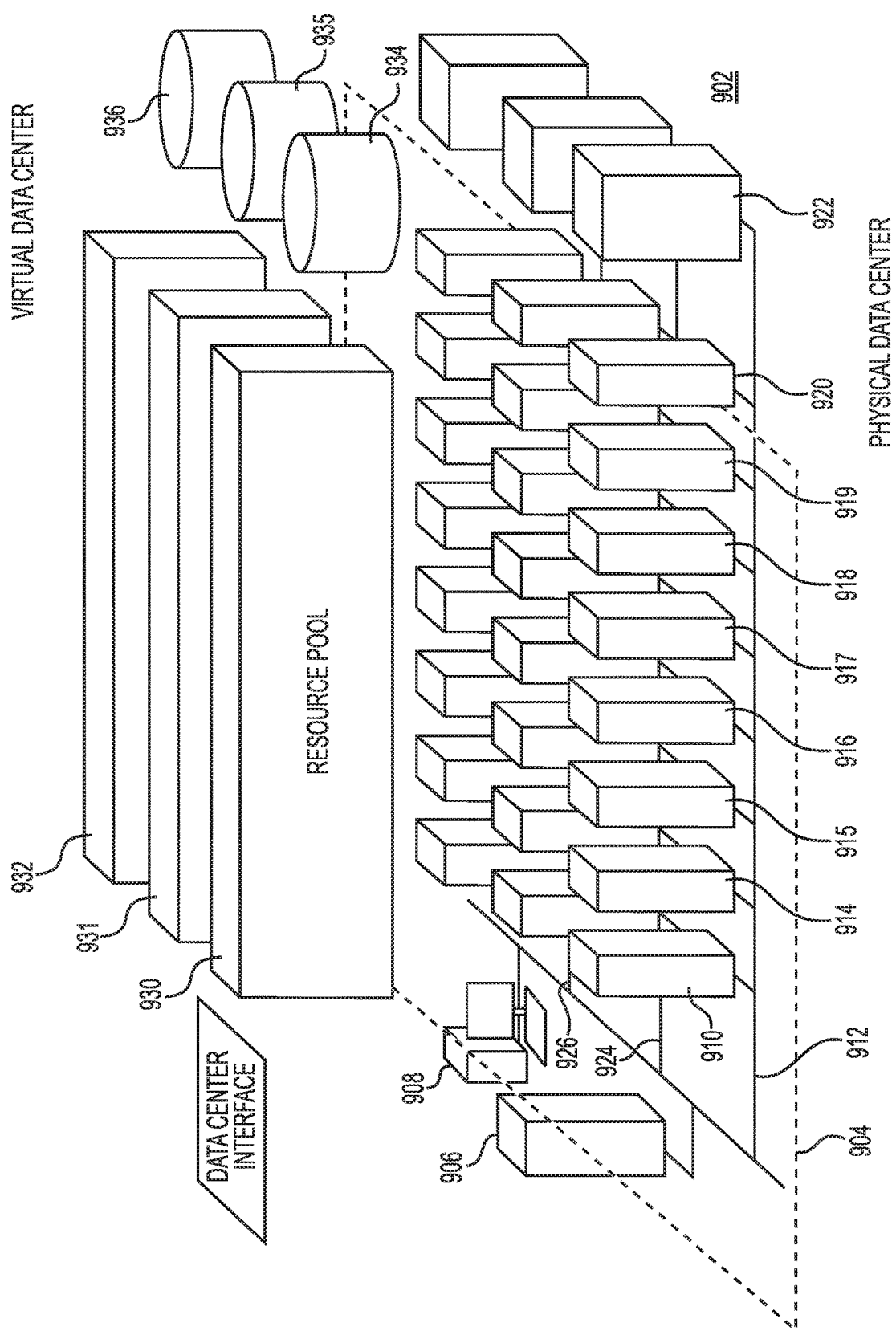
FIG. 9 is an illustration of an example virtual datacenter for performing the various methods described herein.

FIG. 9 provides an illustration of a simplified SDDC that can perform the various methods described herein. Specifically, FIG. 9 illustrates virtual data centers provided as an abstraction of underlying physical-data-center hardware components. In some examples, the virtualized data center is considered an SDDC. A physical data center 902 is shown below a virtual-interface plane 904. The physical data center consists of a virtual-infrastructure management server ("VI-management-server") 906 and any of various different computers, such as PCs 908, on which a virtual-data-center management interface may be displayed to system administrators and other users. The interface can be a software-based control system, such as VMWARE VCLOUD DIRECTOR.

The physical data center additionally includes a number of server computers, such as server computer 910, that are coupled together by local area networks, such as local area network 912 that directly interconnects server computer 910 and 914-920 and a mass-storage array 922. The physical data center shown in FIG. 9 includes three local area networks 912, 924, and 926 that each directly interconnects a bank of eight servers and a mass-storage array. The individual server computers, such as server computer 910, each includes a virtualization layer and runs multiple virtual machines. Different physical data centers may include many different types of computers, networks, data-storage systems and devices connected according to many different types of connection topologies. The virtual-data-center abstraction layer 904, a logical abstraction layer shown by a plane in FIG. 9, abstracts the physical data center to a virtual data center comprising one or more resource pools, such as resource pools 930-932, one or more virtual data stores, such as virtual data stores 934-936, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability. It can migrate virtual machines to most effectively utilize underlying physical hardware resources, to replace virtual machines disabled by physical hardware problems and failures, and to ensure that multiple virtual machines supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system.

The SDDC of FIG. 9 can include multiple SDDC instances executing within the SDDC. For example, the SDDC can include an SDDC manager instance that operates on a standalone SDDC stack within the overall SDDC. Similarly, the SDDC can include an SDDC workflow instance that operates on another SDDC stack. The SDDC can include multiple SDDC manager instances and SDDC workflow instances, as described above.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for lifecycle management for a Software-Defined Data Center (SDDC), comprising:
   receiving an upgrade-path manifest indicating a source configuration for the SDDC, a first configuration for the SDDC, and a second configuration for the SDDC, wherein:
      each configuration comprises a plurality of software components and associated versions; and
      the upgrade-path manifest comprises a first upgrade path identifying a first sequence of upgrade bundles to install to upgrade the SDDC from the source configuration to the first configuration, and a second upgrade path identifying a second sequence of upgrade bundles to install to upgrade the SDDC from the source configuration to the second configuration;
   determining, based on a current configuration for the SDDC matching the source configuration in the upgrade-path manifest, that the first and second configurations are available as upgrades;
   displaying, based on the determination, first and second graphical elements corresponding to the first and second configurations; and
   based on a GUI selection of the second graphical element, implementing the second upgrade path by installing the second sequence of upgrade bundles,
   wherein the second upgrade path is optimized to skip installation of at least one intermediate upgrade bundle associated with the first upgrade path.

2. The method of claim 1, wherein an agent on the SDDC executes the second upgrade path based on an ordered sequence of upgrade bundles identified in the upgrade-path manifest.

3. The method of claim 1, wherein receiving the upgrade-path manifest comprises retrieving the upgrade-path manifest from a software database.

4. The method of claim 1, wherein receiving the upgrade-path manifest comprises retrieving, from a software database, a custom upgrade-path manifest having an identifier associated with a customer operating the SDDC.

5. The method of claim 4, wherein the custom upgrade-path manifest is generated at a master orchestrator based on information received from the SDDC regarding the current configuration for the SDDC.

6. The method of claim 1, wherein before implementing the second upgrade path, checking a version compliance matrix to confirm that a plurality of software elements of the SDDC will retain compliance with one another after installing the second sequence of upgrade bundles.

7. The method of claim 1, further comprising:
   receiving a blacklist identifying a blacklisted upgrade bundle;
   removing the blacklisted upgrade bundle from an SDDC storage location; and
   adding an identifier of the blacklisted upgrade bundle to a blacklist of upgrade bundles not to be downloaded in the future.

8. A non-transitory, computer-readable medium containing instructions that, when executed by a hardware-based processor, performs stages for lifecycle management for a Software-Defined Data Center (SDDC), the stages comprising:
   receiving an upgrade-path manifest indicating a source configuration for the SDDC, a first configuration for the SDDC, and a second configuration for the SDDC, wherein:
      each configuration comprises a plurality of software components and associated versions; and
      the upgrade-path manifest comprises a first upgrade path identifying a first sequence of upgrade bundles to install to upgrade the SDDC from the source configuration to the first configuration, and a second upgrade path identifying a second sequence of upgrade bundles to install to upgrade the SDDC from the source configuration to the second configuration;
   determining, based on a current configuration for the SDDC matching the source configuration in the upgrade-path manifest, that the first and second configurations are available as upgrades;
   displaying, based on the determination, first and second graphical elements corresponding to the first and second configurations;
   based on a GUI selection of the second graphical element, implementing the second upgrade path by installing the second sequence of upgrade bundles;
   wherein the second upgrade path is optimized to skip installation of at least one intermediate upgrade bundle associated with the first upgrade path.

9. The non-transitory, computer-readable medium of claim 8, wherein an agent on the SDDC executes the second upgrade path based on an ordered sequence of upgrade bundles identified in the upgrade-path manifest.

10. The non-transitory, computer-readable medium of claim 8, wherein receiving the upgrade-path manifest comprises retrieving the upgrade-path manifest from a software database.

11. The non-transitory, computer-readable medium of claim 8, wherein receiving the upgrade-path manifest comprises retrieving, from a software database, a custom upgrade-path manifest having an identifier associated with a customer operating the SDDC.

12. The non-transitory, computer-readable medium of claim 11, wherein the custom upgrade-path manifest is generated at a master orchestrator based on information received from the SDDC regarding the current configuration for the SDDC.

13. The non-transitory, computer-readable medium of claim 8, wherein before implementing the second upgrade path, checking a version compliance matrix to confirm that a plurality of software elements of the SDDC will retain compliance with one another after installing the second sequence of upgrade bundles.

14. The non-transitory, computer-readable medium of claim 8, the stages further comprising:
   receiving a blacklist identifying a blacklisted upgrade bundle;
   removing the blacklisted upgrade bundle from an SDDC storage location; and
   adding an identifier of the blacklisted upgrade bundle to a blacklist of upgrade bundles not to be downloaded in the future.

15. A system for lifecycle management for a Software-Defined Data Center (SDDC), comprising:
   a memory storage including a non-transitory, computer-readable medium comprising instructions; and
   a computing device including a hardware-based processor that executes the instructions to carry out stages comprising:
      receiving an upgrade-path manifest indicating a source configuration for the SDDC, a first configuration for the SDDC, and a second configuration for the SDDC, wherein:
         each configuration comprises a plurality of software components and associated versions; and
         the upgrade-path manifest comprises a first upgrade path identifying a first sequence of upgrade bundles to install to upgrade the SDDC from the source configuration to the first configuration, and a second upgrade path identifying a second sequence of upgrade bundles to install to upgrade the SDDC from the source configuration to the second configuration;
      determining, based on a current configuration for the SDDC matching the source configuration in the upgrade-path manifest, that the first and second configurations are available as upgrades;
      displaying, based on the determination, first and second graphical elements corresponding to the first and second configurations;
      based on a GUI selection of the second graphical element, implementing the second upgrade path by installing the second sequence of upgrade bundles;
      wherein the second upgrade path is optimized to skip installation of at least one intermediate upgrade bundle associated with the first upgrade path.

16. The system of claim 15, wherein an agent on the SDDC executes the second upgrade path based on an ordered sequence of upgrade bundles identified in the upgrade-path manifest.

17. The system of claim 15, wherein receiving the upgrade-path manifest comprises retrieving the upgrade-path manifest from a software database.

18. The system of claim 15, wherein receiving the upgrade-path manifest comprises retrieving, from a software database, a custom upgrade-path manifest having an identifier associated with a customer operating the SDDC.

19. The system of claim 18, wherein the custom upgrade-path manifest is generated at a master orchestrator based on information received from the SDDC regarding the current configuration for the SDDC.

20. The system of claim 15, wherein before implementing the second upgrade path, checking a version compliance matrix to confirm that a plurality of software elements of the SDDC will retain compliance with one another after installing the second sequence of upgrade bundles.

* * * * *